2,719,177

N-SUBSTITUTED ACRYLAMIDES BY VAPOR PHASE METHOD USING ACRYLIC ACIDS

Harry W. Coover, Jr., and Newton H. Shearer, Jr., Kingsport, Tenn., assignors to Eastman Kodak Company, Rochester, N. Y., a corporation of New Jersey No Drawing. Application March 18, 1953, Serial No. 343,238

6 Claims. (Cl. 260—561)

The present invention relates to the preparation of N-substituted acrylamides by the reaction of acrylic acids with primary and secondary amines. More particularly, the invention is concerned with a vapor phase reaction of the continuous type for the preparation of N-substituted acrylamides from acrylic acids and amines.

It is known that N-substituted acrylamides, i. e. N-alkyl or N-dialkyl may be prepared by means of the reaction represented by the following equation:

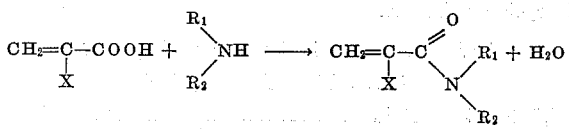

wherein X is selected from the group consisting of hydrogen and methyl, $R_1$ is selected from the group consisting of hydrogen and alkyl radicals, and $R_2$ is an alkyl radical. The method as heretofore practiced is based upon a liquid phase reaction which is highly impractical for commercial operations. It has been suggested that improvement in the instant process might be had by contacting amine vapor with molten acid. This latter procedure appears to be inapplicable to the production of acrylic amides although it seems to be successful with saturated acids inclusive of dicarboxylic acids. An attempt to adapt the molten acid procedure to the preparation of acrylic amides thus indicated that high temperature range reaction might not be suitable for the synthesis of N-substituted amides of the acrylic type. This indication is found in the following example.

*Example 1.—Molten acid procedure of the prior art*

Gaseous dimethylamine was passed into one mole of molten acrylic acid (containing methylene blue as a polymerization inhibitor) at an initial temperature of 120° C. and for a period of three hours at a rate of one mole per hour. This rate of passage was rapid enough to carry out any water vapor produced in the reaction as fast as it formed. The temperature quickly rose to 175° C. and was maintained at 162–175° C., which was the maximum temperature permitted by the boiling point of the reaction mixture. The reaction product was distilled in vacuo. No N,N-dimethylacrylamide (B. P. 43–45°/2 mm. and $n_D^{20}$ 1.4738) could be obtained. Only higher boiling complex mixtures having the following constants could be isolated.

Fraction 1—B. P. 76–83°/1.8 to 2.3 mm., $n_D^{20}$ 1.4622, weight, 14.9 g.

Fraction 2—B. P. 83–90°/2.3 mm., $n_D^{20}$ 1.4636, weight 8.7 g.

Fraction 3—B. P. 97–115/3.2 mm., $n_D^{20}$ 1.4672, weight 6.7 g.

Residue, non-distillable, 65 g.

We have discovered, however, that high temperature operations are eminently successful for the synthesis of N-substitued amides of the acrylic type if the reaction is conducted with both reactants in vapor phase under certain conditions to be described below.

It is an object of this invention therefore to provide an improvement in the method for preparation of N-substituted acrylamides by the reaction of acrylic acids with amines. A more specific object of the invention is to provide a continuous method for the preparation of N-alkyl and N-dialkyl acrylamides and methacrylamides. A further object of the invention is to provide a novel process which results in improved yields of the N-substituted amides. Still another object is the provision of a continuous and more practical process than heretofore known.

In accordance with our invention the improved method comprises contacting the acid and amine in a continuous manner with both in the vapor phase at a temperature within the range of 250°–550° C. in the presence of a dehydration catalyst. In a most advantageous embodiment of our invention, the process comprises reacting an acrylic acid, e. g. acrylic acid or methacrylic acid with a primary or secondary alkyl amine for a period of time within the range of about 1–7 seconds in the presence of a catalyst selected from the group of alumina-containing materials comprising alumina, silica-alumina, and vanadia-alumina.

The products of the invention are useful materials for polymerizations, particularly for cold polymerizations and graft polymerizations.

While the invention is particularly useful in the preparation of N-alkyl and N-dialkyl amides, its utility extends also to other types of amides such as the N-cyclohexyl and N-phenyl acrylamides and methacrylamides.

Of the dehydration types catalysts which we have found useful, alumina-containing materials as identified above appear to be the most advantageous and are therefore preferred. However, we have found that we may also use aluminum phosphate-alumina and various combinations of the rare earth oxides. The alumina-silica catalyst may be a commercial grade material such as that sold by Universal Oil Products Company as type A cracking catalyst and the vanadia-alumina catalyst may be of a commercial grade such as that sold as catalyst V–223 by the Harshaw Chemical Company.

The ratio of acid to amine may be varied over a wide range. The preferred range is from 1 mol of acid per 1 mol of amine to 1 mol of acid per 2.5 mols of amine. Contact time may also be varied widely but 1 to 7 seconds has proved most advantageous.

The invention is illustrated in the following examples:

*Example 2.—N-methylmethacrylamide*

Ninety per cent aqueous methacrylic acid and anhydrous methyl amine in a ratio of 1 mole of acid per 1.1 mole of amine were passed over activated alumina pellets at 250° C.; contact time, 3.1 seconds. The product was tried over sodium sulfate followed by magnesium sulfate, then filtered. The filtrate, after addition of hydroquinone (1/10 per cent), was distilled and N-methylmethacrylamide was collected at 70–73° C. at 1 mm. The crude product contained small amounts of acidic and basic impurities. It was purified by washing a benzene solution of the amide with 2 per cent aqueous hydrochloric acid saturated with salt followed by 3 per cent aqueous sodium hydroxide saturated with salt, drying, and redistillation.

*Example 3.—N-ethylmethacrylamide*

A ratio of 1 mole 90 per cent aqueous methacrylic acid to 2 moles of ethyl amine was passed over activated alumina lumps at 350° C.; contact time, 2 seconds. After drying, the product distilled at 79–82° C. at 1 mm.

Example 4.—N,N-dimethylmethacrylamide

A ratio of 1 mole 90 per cent methacrylic acid to 1.5 mole of dimethylamine was passed over an alumina-silica catalyst (U. O. P. type A cracking catalyst) at 300° C. with a 4 second contact time. After drying, the product was collected by distillation at 50–55° C. at 1 mm.

Example 5.—N-isopropylacrylamide

A ratio of 1 mole glacial acrylic acid in benzene solution to 1.3 moles of isopropylamine was passed over activated alumina pellets at 260° C.; contact time, 6 seconds. After drying, the product was separated by distillation at 85–88° C. at 1 mm.

Example 6.—N-cyclohexylacrylamide

A ratio of 1 mole of glacial acrylic acid in benzene solution to 2 moles of cyclohexylamine was passed over activated alumina pellets at 480° C.; contact time, 1 second. The resulting benzene solution was dried and the product distilled at 109–112° C. at 1 mm.

Example 7.—N-phenylacrylamide

A solution of anhydrous acrylic acid in benzene was pyrolyzed in a ratio of 1 mole of the acid to 2.5 moles of aniline over vanadia-alumina (Harshaw V-223) catalyst at 350° C. and 3 seconds contact ime. After purification by washing the benzene solution with dilute acid and dilute base, the product was separated by distillation at 112° C.–115° C. at 1 mm.

We claim:

1. A continuous method for the preparation of an N-substituted acrylamide comprising the steps of (1) forming a mixture of (a) a vapor of an acrylic acid selected from the group consisting of acrylic acid and methacrylic acid with (b) a vapor of an amine selected from the group consisting of primary and secondary lower alkyl amines, cyclohexyl amine and aniline, the ratio of acid to amine being within the range of about 1:1 to about 1:2.5, (2) forming a moving stream of the vapor mixture, (3) passing the moving stream over a dehydration catalyst selected from the group consisting of alumina, silica-alumina, vanadia-alumina, and aluminum phosphate-alumina, the catalyst being maintained at a temperature within the range of about 250° C. to about 550° C. and forming a product gas while maintaining a mixture-catalyst contact time within the range of about 1 to 7 seconds, (4) condensing the product gas, and (5) recovering from the condensed product gas an acrylamide corresponding to the acrylic acid employed and having an N-substituent corresponding to the amine employed.

2. A method as defined in claim 1 wherein the amine is methyl amine.

3. A method as defined in claim 1 wherein the amine is ethyl amine.

4. A method as defined in claim 1 wherein the amine is dimethylamine.

5. A method as defined in claim 1 wherein the amine is isopropylamine.

6. A method as defined in claim 1 wherein the amine is cyclohexylamine.

References Cited in the file of this patent

UNITED STATES PATENTS

| | | |
|---|---|---|
| 1,986,854 | Reid | Jan. 8, 1935 |
| 2,357,484 | Martin | Sept. 5, 1944 |